United States Patent

Minotti

(10) Patent No.: US 12,325,536 B2
(45) Date of Patent: Jun. 10, 2025

(54) SPACECRAFT PROVIDED WITH LOW AND HIGH THRUST PROPULSION SYSTEM

(71) Applicant: MIPRONS SRL, Segni (IT)

(72) Inventor: Angelo Minotti, Segni (IT)

(73) Assignee: MIPRONS SRL, Segni (IT)

( * ) Notice: Subject to any disclaimer, the term of this patent is extended or adjusted under 35 U.S.C. 154(b) by 0 days.

(21) Appl. No.: 18/254,811

(22) PCT Filed: Dec. 1, 2021

(86) PCT No.: PCT/IB2021/061166
§ 371 (c)(1),
(2) Date: May 26, 2023

(87) PCT Pub. No.: WO2022/118208
PCT Pub. Date: Jun. 9, 2022

(65) Prior Publication Data
US 2024/0002073 A1    Jan. 4, 2024

(30) Foreign Application Priority Data

Dec. 4, 2020 (IT) .................. 102020000030011

(51) Int. Cl.
*B64G 1/40* (2006.01)
*F02K 9/42* (2006.01)
(Continued)

(52) U.S. Cl.
CPC ........... *B64G 1/4021* (2023.08); *B64G 1/401* (2013.01); *B64G 1/402* (2013.01); *F02K 9/425* (2013.01); *F02K 9/605* (2013.01); *F02K 9/62* (2013.01)

(58) Field of Classification Search
CPC ............ F02K 9/425; F02K 9/605; F02K 9/62
See application file for complete search history.

(56) References Cited

U.S. PATENT DOCUMENTS

| 4,265,721 A | 5/1981 | Hackmyer |
| 4,345,729 A * | 8/1982 | Barter .................... B64G 1/401 60/39.12 |
| 2004/0245406 A1 | 12/2004 | Guiheen et al. |

FOREIGN PATENT DOCUMENTS

| CN | 1804386 A | 7/2006 |
| EP | 3246559 A1 | 11/2017 |

(Continued)

OTHER PUBLICATIONS

VACCO "ArgoMoon Propulsion System" (Year: 2017).*
(Continued)

*Primary Examiner* — David P. Olynick
(74) *Attorney, Agent, or Firm* — Byrne Poh LLP

(57) ABSTRACT

A spacecraft is equipped with a low and high thrust space propulsion system including at least one water reservoir (1) containing liquid water, a high thrust propulsion part and a low thrust propulsion part. The high thrust propulsion part has a high thruster including a regulation valve (V1) for drawing water from the liquid water reservoir (1), a device for splitting (2) liquid water into gaseous hydrogen and gaseous oxygen, relative storage tanks (3, 4), a combustion chamber (5) in which the gaseous hydrogen reacts with the gaseous oxygen and an exhaust nozzle (6) from the combustion chamber (5). The low thrust propulsion part comprises a liquid water supply line (10) and a plurality of liquid water outlets in a plurality of branches (11-1n) individually including a regulating valve (21-2n), a vaporization chamber (31-3n) and an expansion nozzle (41-4n).

9 Claims, 1 Drawing Sheet

(51) Int. Cl.
*F02K 9/60* (2006.01)
*F02K 9/62* (2006.01)

(56) References Cited

FOREIGN PATENT DOCUMENTS

EP 3348671 A1 7/2018
WO 2019021234 A1 1/2019

OTHER PUBLICATIONS

Rovey "Review of multimode space propulsion" (Year: 2020).*
Serra "Hydrogen production via microwave-induced water splitting at low temperature" (Year: 2020).*
Asakawa, J., et al., "Fundamental Ground Experiment of a Water Resistojet Propulsion System: AQUARIUS Installed on a 6U CubeSat: EQUULEUS", In Transactions of the Japan Society for Aeronautical and Space Sciences Aerospace Technology, Japan, vol. 16, No. 5, Jan. 2018, pp. 427-431.

* cited by examiner

SPACECRAFT PROVIDED WITH LOW AND HIGH THRUST PROPULSION SYSTEM

TECHNICAL FIELD

The present invention relates to a spacecraft provided with a low and high thrust propulsion system also known as dual-mode. Said spacecraft is a satellite.

BACKGROUND ART

In recent times, investments have been increasing for the launch of new satellites, usually in constellations, to obtain global and instant connection and observation.

The investment increase has allowed the development of technologies for the miniaturization of the propulsion systems which allow to create reduced dimension satellite platforms. Advantages are obtained, such as, for example, a reduction of the satellite cost, with the same functions performed, and a time reduction in designing, manufacturing and launching satellites that are always up to date from a technological point of view. In fact, a nanosatellite is launched into orbit in about 2-3 years from the start of the design, while large satellites also require tens of years for their design and launch.

Nanosatellites require new propulsion systems, small and powerful enough to be suitable to perform requested manoeuvres.

A satellite needs propulsion systems, basically: 1) for attitude and control manoeuvres (RCS—Reaction Control System), in order to control satellite attitude and repositioning; 2) for orbit change manoeuvres (Delta-V), to enter operational orbit or to de-orbit at the end of service life, both natural and on demand; and 3) for other manoeuvres which can be considered a combination of the previous ones.

These manoeuvres need two types of thrust power. The attitude and control manoeuvres require low thrust, and the orbit change normally requires high thrust.

Currently, on miniaturized satellites, low thrust manoeuvres generally use electric propulsion systems, and high thrust manoeuvres request an addition of another propulsion system with a consequent complication in terms of weight increase, reduction of volumes available for paying load, cost increase, reliability reduction, etc.

If a second propulsion system is not added, it is necessary to carry out the manoeuvres at high thrust by means of the low thrust propulsion system, with a result of a substantial increase in the time required to complete the manoeuvres and a significant reduction in the useful life of the satellite.

EP 3348671 A1 discloses a space propulsion system comprising in a spacecraft a reservoir containing liquid water and a drive unit including a regulating valve for sucking liquid water from the reservoir, a water splitting device for splitting the liquid water into gaseous hydrogen and gaseous oxygen, a combustion chamber, in which the gaseous hydrogen reacts with the gaseous oxygen, and an exhaust nozzle from the combustion chamber.

Further, EP 3246559 A1 describes a space propulsion system similar to that one of EP 3348671 A1.

US 2004/245406 A1 describes a microthruster that comprises a reaction chamber to provide a propellant plume which is directed from a nozzle to the exterior of a spacecraft to provide thrust. The monopropellant used can be water.

Fundamental Ground Experiment of a Water Resistojet Propulsion System: AQUARIUS Installed on a 6U CubeSat: EQUULEUS, by Jun ASAKAWA et al. (Trans. JSASS Aerospace Tech. Japan, Vol. 16, No. 5, pp. 427-431, 2018) describes the AQUARIUS thrust generation process, which uses water as a propellant. Liquid water is contained in a bladder inside a pressurizing tank. The water leaving the bladder passes through regulation valves into a vaporization chamber equipped with a drain valve and pressure sensors. For a first part, the vapor exiting the vaporization chamber is sent through respective Delta-V thruster valves to two Delta-V thrusters, each of which includes a pre-heater, a Delta-V thruster thermal insulator and a nozzle. For a second part, the vapor exiting the vaporization chamber is sent through respective RCS thruster valves to four RCS thrusters, each comprising a pre-heater, an RCS thruster thermal insulator and an RCS nozzle. In the same document one can read that the thrust provided by a Delta-V thruster is 4.0 mN, while the thrust provided by an RCS thruster is 2.0 mN. AQUARIUS demonstrates the convenience of using a single propellant, namely water, to produce low thrust and high thrust. However, the high thrust produced by the AQUARIUS Delta-V thruster is quite low with the consequence that the orbit change manoeuvres are very slow and the satellite spends part of its life in an inactive way.

The same applicant filed the international patent application WO 2019/021234 which describes a space propulsion system, comprising a liquid water reservoir, an electrolytic device for splitting water into oxygen and hydrogen, a combustion chamber into which the hydrogen and oxygen are injected for their combustion, and a supersonic nozzle for the discharge of the combustion products. Such a propulsion system provides a thrust of orders of magnitude higher than that obtained by the AQUARIUS Delta-V thrusters while maintaining the same dimensions.

SUMMARY OF INVENTION

An object of the present invention is to provide a single propulsion system which is so versatile as to be able to perform both low thrust and high thrust manoeuvres.

Another object of the invention is to create a propulsion system that is so compact that it can also be installed on nanosatellites.

A further object is to provide a propulsion system which uses a single propellant at least as its primary energy source.

Finally, another object is to provide a low and high thrust propulsion system that is particularly efficient in high thrust and can conveniently use, directly or indirectly, water as the only propellant.

The propulsion system, according to the present invention, aims to use only liquid water to feed both high thrusters and low thrusters. The high thrusters use water electrolysis and combustion of hydrogen and oxygen. Alternatively, another hydrogen/oxygen creation system, such as the microwave one, can be used. The low thrusters employ expansion of water vapor obtained by heating the water itself.

Two lines depart from the liquid water reservoir, one for high thrust and one for low thrust.

The high thrust line provides that:
  an electrolyser or other system, e. g. a microwave system, through the electricity taken from solar panels, or potentially even from batteries or other sources, break the hydrogen-oxygen bonds of the water, thus producing gaseous hydrogen and gaseous oxygen;
  the gases are accumulated or not in external or internal storage tanks of the electrolyser or other hydrogen-oxygen production system;
  the gases are introduced into the thrust chamber, premixed or not, in order to trigger their combustion through catalytic material and/or spark and/or resistance by heating and/or combination of these solutions;

the hot gases from the combustion are expanded in an exhaust nozzle to obtain the desired thrust;

there is the presence of valves and sensors necessary for the correct functioning of the system.

The low thrust line provides that:

the water enters the thrust chamber and, through an electric resistance, is heated to the state of steam;

the steam is made to expand in the relative exhaust nozzle to obtain the low thrust necessary for the required manoeuvre;

there is the presence of valves and sensors necessary for the correct operation of the system.

BRIEF DESCRIPTION OF DRAWINGS

The objects and features of the present invention will become most clear from the description of a spacecraft provided with a low and high thrust propulsion system, with reference to the attached figures in which.

DESCRIPTION OF AN EMBODIMENT

Figure 1:
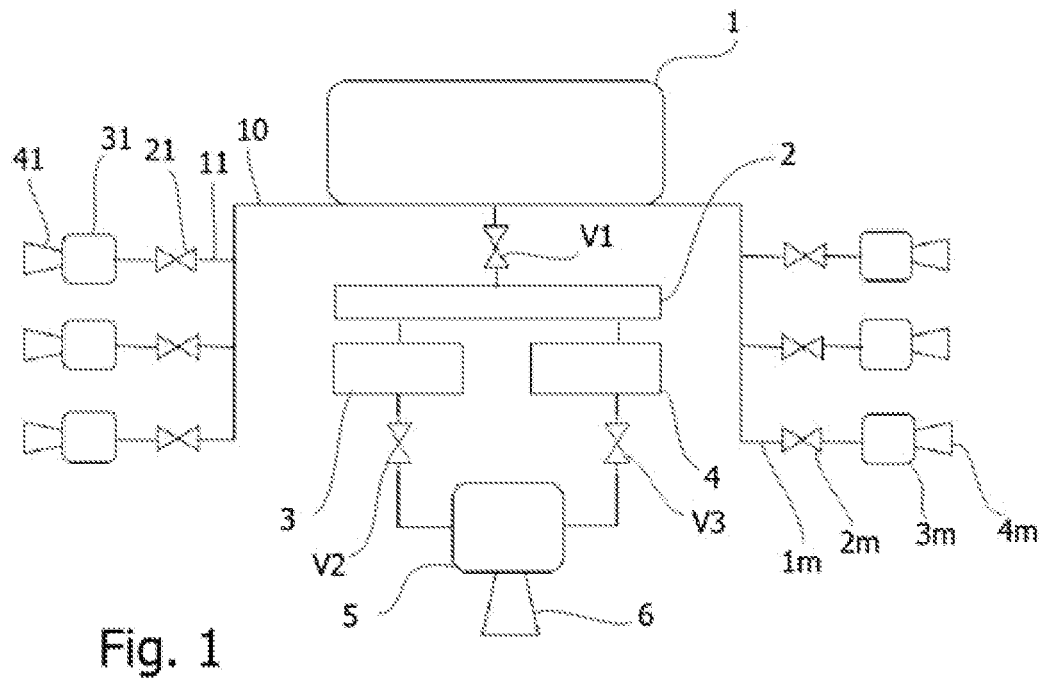
FIG. 1 is an illustrative block diagram of the propulsion system according to the present invention.

Referring to [FIG. 1], the propulsion system according to the present invention comprises a high thrust propulsion part and a low thrust propulsion part.

The high thrust propulsion part has a thruster comprising a water reservoir 1 for containing liquid water, a water splitting device 2 for splitting the liquid water into gaseous hydrogen and gaseous oxygen and storing them in a gaseous hydrogen storage tank 3 and in a gaseous oxygen storage tank 4, respectively, and a high thrust chamber 5 with nozzle 6 for discharging the combustion products. The splitting device could be a water electrolyser that electrolysis water into gaseous hydrogen and gaseous oxygen, or a water microwave splitting device for splitting water into gaseous hydrogen and gaseous oxygen, or another device. As for the hydrogen storage tank 3 and the oxygen storage tank 4, they could be reduced to a single one in which hydrogen and oxygen are mixed and fed into the combustion chamber already mixed.

Alternatively, the accumulation of gaseous hydrogen and gaseous oxygen, premixed or not, is inside the water splitting device 2.

Another configuration could be that without any storage tank: this solution assumes that the splitting of water, instantaneous and/or continuous, by means of an electrolyser or microwave device, or different device, produces enough hydrogen and oxygen to be able to perform punctual and/or continuous thrusts, as needed by a mission, and to not require accumulation of the gases produced, either internally or externally to the water splitting device, before entering the combustion chamber.

The low thrust propulsion part of the propulsion system includes a supply line 10 of liquid water from reservoir 1 and a plurality of water derivations in branches 11-1$n$, where n indicates the total number of branches. Each branch 11-1$n$ has a regulation valve 21-2$n$, a vaporization chamber 31-3$n$ and an expansion nozzle 41-4$n$ downstream of the vaporization chamber 31-3$n$.

It is preferable that the low thrust propulsion part has at least four vaporization chambers, although six vaporization chambers with seven flow control valves are shown in the block diagram of [FIG. 1].

The presence of at least one electronic board is required to control the operation of the space propulsion system and interaction with the other satellite systems, such as an on-board computer with mission specifications.

Usually, indicated as high thrust chambers are those able to provide thrusts of about 0.1 N, as order of magnitude, and more. The thruster according to the invention is able to provide thrusts also up to 10 N or more.

The vaporization chambers of the low thrust propulsion part according to the invention are characterized by thrusts about 0.001 N, as order of magnitude, or less; usually there are thrusts in the range of 1-10 mN.

The high thrust chamber can work at high pressures, even, as order of magnitude, about 5,000 kPa.

Low thrust chambers work at low pressures, even, as order of magnitude, below 100 kPa.

The high thrust chamber can have dimensions of the order of one centimeter (nozzle excluded). A chamber of 10×10 mm (diameter×height) can give a thrust of 1-5 N.

The low thrust chambers can have dimensions of the order of millimeters, nozzle included. Chambers of 8×8×2 mm (length×width×height) can provide thrusts in the range of 1-25 mN.

The high thrust chamber is made of metal materials, such as steel, titanium, tungsten. The low thrust chambers can also be on silicon wafers.

A global dimension of the low and high thrust space propulsion system, excluding the water reservoir, can be envisaged, with dimensions around 100×100×40-45 mm (length×width×height) and a weight of around 400 g.

The advantages of the present invention are understood. Although in different physical and chemical forms, the propellant is unique: liquid water. It is used on the same spacecraft to obtain: 1) high thrust through water splitting into gaseous hydrogen and gaseous oxygen, hydrogen and oxygen combustion and discharge of combustion products through an exhaust nozzle 6; and 2) low thrust by vaporizing water and making it expand in the expansion nozzle 41-4$n$.

Figure 2:
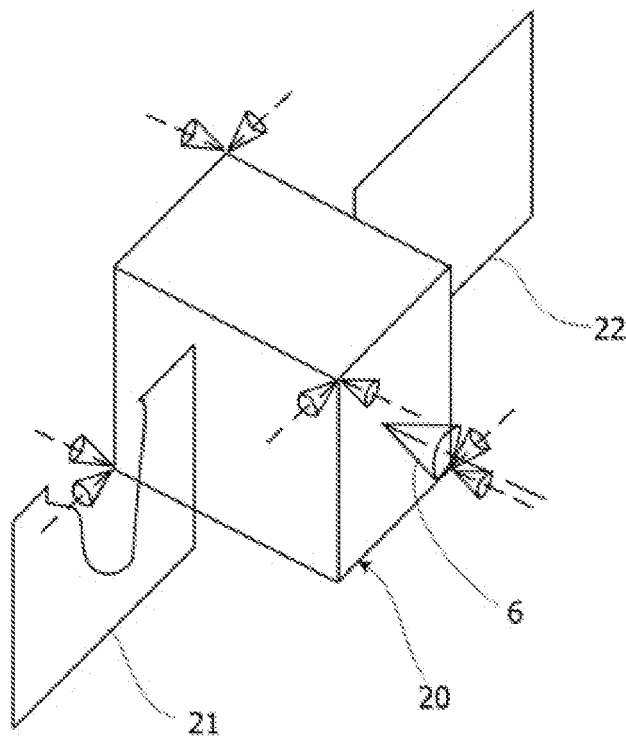
FIG. 2 is a partially cut-away schematic perspective view of a satellite equipped with the propulsion system in [FIG. 1].

[FIG. 2] is a partially cut-away schematic perspective view of a satellite equipped with the propulsion system of [FIG. 1]. The satellite has a substantially prismatic body 20 with solar panels 21, 22. The solar panel 21 is partially cut to show a pair of low thrust nozzles placed mutually orthogonal on two vertices of one face of the prismatic body and on two consecutive vertices of the opposite face of the prismatic body 20. The discharge nozzle 6 is shown schematically in a position orthogonal to one face of prismatic body 20 of the satellite.

In conclusion and to summarize, the choice of using water as an optimal propellant for a low-high thrust system is based on several considerations. In summary, liquid water is
  economic;
  non-toxic;
  not corrosive;
  easily storable and manageable, which further simplifies the processes and the cost of use;
  characterized by a high density, and this allows compact systems;
  hydrogen/oxygen carrier, which are the chemical couple with the highest performance (high thrust and high specific impulse);

hydrogen/oxygen carrier without being brought to the cryogenic state, and therefore does not involve significant design, economic and management complications; versatile and modular.

We claim:

1. A spacecraft comprising:
at least one water reservoir containing liquid water, a first thrust propulsion part and a second thrust propulsion part, wherein:
the first thrust propulsion part provides at least five times the thrust of the second propulsion part;
the first thrust propulsion part comprises at least one first thruster each comprising:
   a regulating valve that receives the liquid water from the at least one water reservoir a water splitting device that splits the liquid water into gaseous hydrogen and gaseous oxygen;
   a combustion chamber in which the gaseous hydrogen reacts with the gaseous oxygen; and an exhaust nozzle coupled to an output of the combustion chamber; and
the second thrust propulsion part comprises:
   a liquid water supply line that receives liquid water from the at least one water reservoir; and
   a plurality of branches, each coupled to the liquid water supply line and each comprising:
      a regulating valve that receives the liquid water from the liquid water supply line;
      a vaporization chamber downstream of the regulating valve; and
      an expansion nozzle downstream of the vaporization chamber.

2. The spacecraft according to claim 1, wherein the water splitting device-comprises an electrolyser adapted to split the liquid water into the gaseous hydrogen and the gaseous oxygen.

3. The spacecraft according to claim 1, wherein the water splitting device comprises a microwave device adapted to split the liquid water into the gaseous hydrogen and the gaseous oxygen.

4. The spacecraft according to claim 1, wherein at least one of the at least one first thruster further comprises at least one gaseous hydrogen storage tank and at least one gaseous oxygen storage tank, each coupled between the water splitting device and the combustion chamber.

5. The spacecraft according to claim 1, wherein at least one of the at least one first thruster further comprises at least one storage tank for premixed gaseous hydrogen and gaseous oxygen coupled between the water splitting device and the combustion chamber.

6. The spacecraft according to claim 1, wherein at least one of the at least one first thruster further comprises at least one gaseous hydrogen storage tank and at least one gaseous oxygen storage tank inside the water splitting device.

7. The spacecraft according to claim 1, wherein at least one of the at least one first thruster does not comprise a gaseous hydrogen storage tank and does not comprise a gaseous oxygen storage tank.

8. The spacecraft according to claim 1 wherein each combustion chamber of the first thrust propulsion part is configured to provide thrust in a range of one to five Newtons.

9. The spacecraft according to claim 1 wherein each vaporization chamber of the second thrust propulsion part is configured to provide thrust in a range of one to twenty five milli-Newtons.

* * * * *